United States Patent
Takei et al.

(10) Patent No.: US 11,390,288 B2
(45) Date of Patent: Jul. 19, 2022

(54) OTHER-VEHICLE ACTION PREDICTION METHOD AND OTHER-VEHICLE ACTION PREDICTION DEVICE

(71) Applicant: Nissan Motor Co., Ltd., Yokohama (JP)

(72) Inventors: Shoichi Takei, Kanagawa (JP); Shinya Tanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/311,172

(22) PCT Filed: Dec. 11, 2018

(86) PCT No.: PCT/IB2018/001545
§ 371 (c)(1),
(2) Date: Jun. 4, 2021

(87) PCT Pub. No.: WO2020/121010
PCT Pub. Date: Jun. 18, 2020

(65) Prior Publication Data
US 2022/0024461 A1   Jan. 27, 2022

(51) Int. Cl.
*B60W 40/09* (2012.01)
*B60W 30/12* (2020.01)
*G08G 1/01* (2006.01)

(52) U.S. Cl.
CPC ............ *B60W 40/09* (2013.01); *B60W 30/12* (2013.01); *G08G 1/0133* (2013.01);
(Continued)

(58) Field of Classification Search
CPC .............. B60W 40/09; B60W 30/12; B60W 2554/4045; G08G 1/0133; G08G 1/0145
See application file for complete search history.

(56) References Cited

U.S. PATENT DOCUMENTS

| 8,781,720 B2 * | 7/2014 | Kindo | G08G 1/167 |
| | | | 701/300 |
| 9,616,924 B2 * | 4/2017 | Spero | B60K 35/00 |

(Continued)

FOREIGN PATENT DOCUMENTS

| JP | H1139597 A | 2/1999 |
| JP | 2008037218 A | 2/2008 |

(Continued)

*Primary Examiner* — Luis A Martinez Borrero
(74) *Attorney, Agent, or Firm* — Young Basile Hanlon & MacFarlane, P.C.

(57) ABSTRACT

An other-vehicle action prediction method predicts that another vehicle traveling in an adjacent lane adjacent to an own lane in which a host vehicle is traveling makes a lane change from the adjacent lane to the own lane in front of the host vehicle in accordance with the behavior of the other vehicle. The other-vehicle action prediction method acquires traffic regulation information on a traffic regulation regarding the adjacent lane, predicts a predicted traveling state of the other vehicle when traveling according to the traffic regulation, calculates a recognition possibility that the other vehicle recognizes the traffic regulation, and predicts that the other vehicle makes a lane change in accordance with the recognition possibility, the predicted traveling state, and the actual traveling state.

24 Claims, 4 Drawing Sheets

(52) U.S. Cl.
CPC ... *G08G 1/0145* (2013.01); *B60W 2510/0638* (2013.01); *B60W 2554/4045* (2020.02); *B60W 2554/4049* (2020.02)

(56) References Cited

U.S. PATENT DOCUMENTS

| | | | | |
|---|---|---|---|---|
| 9,669,872 | B2* | 6/2017 | Rebhan | B60W 30/16 |
| 9,799,218 | B1* | 10/2017 | Gordon | G05D 1/0285 |
| 10,783,789 | B2* | 9/2020 | Mizutani | B60W 30/0956 |
| 10,871,783 | B2* | 12/2020 | Julian | G05D 1/0274 |
| 11,004,000 | B1* | 5/2021 | Gutmann | B60W 30/0956 |
| 11,027,736 | B2* | 6/2021 | Rajab | B60W 30/18163 |
| 2005/0256630 | A1* | 11/2005 | Nishira | B60W 40/04 |
| | | | | 701/41 |
| 2015/0194055 | A1* | 7/2015 | Maass | G08G 1/163 |
| | | | | 340/905 |
| 2016/0167582 | A1* | 6/2016 | Chen | G01C 21/32 |
| | | | | 348/148 |
| 2016/0171893 | A1* | 6/2016 | Chen | G01S 17/931 |
| | | | | 701/300 |
| 2017/0334446 | A1* | 11/2017 | Bosch | B60W 50/10 |
| 2018/0061237 | A1* | 3/2018 | Erickson | G08G 1/0112 |
| 2018/0120859 | A1* | 5/2018 | Eagelberg | B60W 60/0027 |
| 2018/0162396 | A1* | 6/2018 | Ibuka | G05D 1/0088 |
| 2018/0253975 | A1* | 9/2018 | Mizutani | B60W 30/18163 |
| 2019/0009784 | A1 | 1/2019 | Takeda | |
| 2019/0025853 | A1* | 1/2019 | Julian | G06T 7/74 |
| 2019/0077398 | A1* | 3/2019 | Kusano | G06V 20/584 |
| 2019/0095809 | A1* | 3/2019 | Hyun | B60W 40/04 |
| 2019/0135290 | A1* | 5/2019 | Marden | B60W 60/001 |
| 2020/0164873 | A1* | 5/2020 | Nanri | G06V 20/588 |
| 2020/0409389 | A1* | 12/2020 | Julian | G06V 10/25 |
| 2022/0105929 | A1* | 4/2022 | Takei | B60W 50/0097 |

FOREIGN PATENT DOCUMENTS

| | | |
|---|---|---|
| JP | 2009003650 A | 1/2009 |
| JP | 2010129055 A | 6/2010 |
| WO | 2017/022447 A1 | 2/2017 |

* cited by examiner

FIG. 4

|  |  | RECOGNITION POSSIBILITY R | | |
|---|---|---|---|---|
|  |  | HIGH ($R > Th_{b1}$) | MIDDLE ($Th_{b1} \geq R > Th_{b2}$) | LOW ($Th_{b2} \geq R$) |
| AMOUNT OF DEVIATION a | LARGE ($a > Th_{a1}$) | 1 | 1 | 1 |
| | SMALL ($Th_{a1} \geq a > Th_{a2}$) | 1 | 0 | 0 |
| | NONE ($Th_{a2} \geq a$) | 0 | 0 | 0 |

FIG. 5

|  |  | RECOGNITION POSSIBILITY R | | |
|---|---|---|---|---|
|  |  | HIGH ($R > Th_{b1}$) | MIDDLE ($Th_{b1} \geq R > Th_{b2}$) | LOW ($Th_{b2} \geq R$) |
| DISCREPANCY d | LARGE ($d > Th_{d1}$) | 1 | 1 | 1 |
| | SMALL ($Th_{d1} \geq d > Th_{d2}$) | 1 | 0 | 0 |
| | NONE ($Th_{d2} \geq d$) | 0 | 0 | 0 |

FIG. 6

|  |  | RECOGNITION POSSIBILITY | | |
|---|---|---|---|---|
|  |  | HIGH | MIDDLE | LOW |
| Pd (BASED ON DISCREPANCY) | HIGH | 1.0 | 0.9 | 0.8 |
| | MIDDLE | 0.8 | 0.7 | 0.5 |
| | LOW | 0.6 | 0.4 | 0.3 |

OTHER-VEHICLE ACTION PREDICTION METHOD AND OTHER-VEHICLE ACTION PREDICTION DEVICE

TECHNICAL FIELD

The present invention relates to an other-vehicle action prediction method and an other-vehicle action prediction device.

BACKGROUND

Techniques are known that estimate a traveling track of another vehicle (refer to Japanese Unexamined Patent Application Publication No. 2009-003650). The device disclosed in Japanese Unexamined Patent Application Publication No. 2009-003650 obtains traveling tracks of the other vehicle under each of the conditions in which the driver follows traffic regulations and in which the driver does not follow the traffic regulations, and acquires an axis deviation which is a deviation between a direction of a lane in which the other vehicle is traveling and a direction of an axis of the other vehicle. The device estimates the traveling track of the other vehicle while keeping the traveling track under the condition in which the driver follows the traffic regulations when the axis deviation is small, and switching to the traveling track under the condition that the driver does not follow the traffic regulations when the axis deviation is large.

SUMMARY

The device disclosed in Japanese Unexamined Patent Application Publication No. 2009-003650 estimates the traveling track under the condition in which driver does not follow the traffic regulations when the axis deviation is larger than a threshold. The prediction of the traveling track of the other vehicle under the condition in which the driver does not follow the traffic regulations is available only if detecting a large action in the axis direction of the other vehicle. This may lead to a delay in predicting the traveling track of the other vehicle. If the threshold used for the axis deviation is set to be smaller, the device may wrongly predict the traveling track of the other vehicle. The traveling track of the other vehicle thus cannot be predicted promptly and accurately only in accordance with the axis deviation.

In view of the foregoing problem, the present invention provides an other-vehicle action prediction method and an other-vehicle action prediction device capable of preventing an error and a delay in predicting an action of another vehicle.

An aspect of the present invention is an other-vehicle action prediction method for predicting that another vehicle traveling in an adjacent lane adjacent to an own lane in which a host vehicle is traveling makes a lane change from the adjacent lane to the own lane in front of the host vehicle in accordance with a behavior of the other vehicle. The other-vehicle action prediction method acquires an actual traveling state of the other vehicle, acquires traffic regulation information on a traffic regulation regarding the adjacent lane, predicts a predicted traveling state which is a traveling state of the other vehicle when traveling according to the traffic regulation, calculates a recognition possibility that the other vehicle recognizes the traffic regulation, and predicts that the other vehicle makes a lane change in accordance with the recognition possibility, the predicted traveling state, and the actual traveling state.

The aspect of the present invention can prevent an error and a delay in predicting the action of the other vehicle.

BRIEF DESCRIPTION OF THE DRAWINGS

FIG. 4 is a table illustrating an example of data to be referred to when determining whether the other vehicle 12 makes a lane change in accordance with an amount of deviation and a recognition possibility;

FIG. 5 is a table illustrating an example of data to be referred to when determining whether the other vehicle 12 makes a lane change in accordance with a discrepancy and a recognition possibility; and FIG. 6 is a table illustrating an example of data to be referred to when calculating a lane change probability P in accordance with a lane change probability $P_d$ and a recognition possibility R.

DETAILED DESCRIPTION

An embodiment will be described below with reference to the drawings.

Figure 3A:
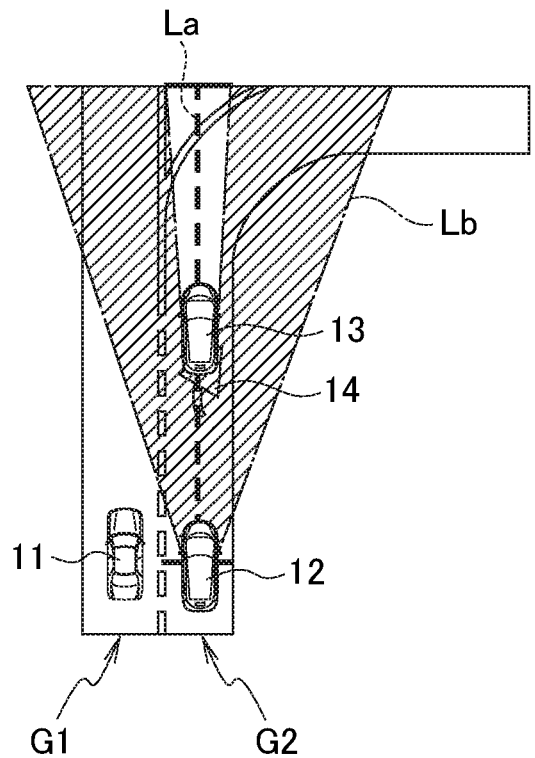
FIG. 3A is a zenithal view illustrating an example of a traveling situation in which a drive assistance device according to the embodiment effectively functions.
Figure 3B:
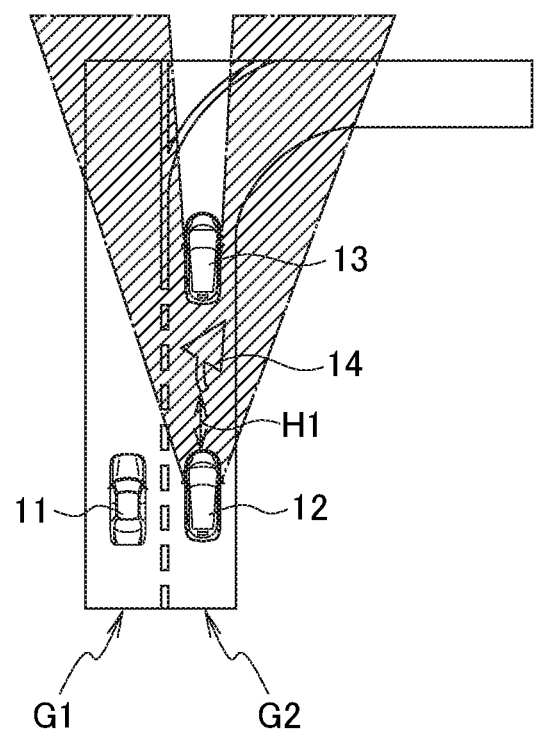
FIG. 3B is a zenithal view illustrating a state after a lapse of a predetermined period of time from the state illustrated in FIG. 3A.

A drive assistance device according to the embodiment effectively functions in a situation as illustrated in FIG. 3A and FIG. 3B, for example. FIG. 3A and FIG. 3B illustrate the situation on a one-way road having two lanes (G1 and G2), in which the host vehicle 11 is traveling in the left lane G1 (the own lane), and another vehicle 12 is traveling in parallel in the right lane G2 (the adjacent lane) adjacent to the own lane. The left lane G1 is a lane continuously straight ahead of the host vehicle 11. The right lane G2 is a lane curved to the right ahead of the other vehicle 12, which is a "right-turn lane". The left lane G1 and the right lane G2 compose the road branching into different directions in front of the host vehicle 11 and the other vehicle 12.

Both the host vehicle 11 and the other vehicle 12 are presumed to intend to keep traveling straight on the road in this situation. While the host vehicle 11 is traveling on the left lane G1 appropriately according to the intention, the other vehicle 12 is traveling on the right lane G2 which is the right-turn lane ahead of the other vehicle 12 contrary to the intention of keeping traveling straight. The other vehicle 12 thus needs to make a lane change from the currently-traveling right lane G2 to the left lane G1 so as to keep traveling straight on the road.

In the traveling situation illustrated in FIG. 3A and FIG. 3B, the other vehicle 12 can be either in an autonomous driving state or in a manual driving state. The term "autonomous driving" refers to a driving mode in which a predetermined vehicle traveling control device independently executes part of or all of recognition, determination, and operation regarding the vehicle driving. The term "manual driving" refers to a driving mode in which an occupant (a person) as a driver in the other vehicle 12 operates to drive the other vehicle 12.

A preceding vehicle 13 is traveling in the right lane G2 in front of the other vehicle 12. A road indication "right-turn arrow 14" is printed on the road surface in the right lane G2. The right-turn arrow 14 is a road indication of a traffic regulation indicating that "the direction to follow in the corresponding lane is the right to which vehicles should turn". The road indication is a sign indicated by a line, a symbol, or letters with road studs, painting, or stones on the road surface to show the regulations or instructions regarding traffic on the corresponding road.

The other vehicle 12 may fail to visually recognize or detect the right-turn arrow 14 ahead because the preceding vehicle 13 is traveling on the right-turn arrow 14 or is stopping on the right-turn arrow 14, as illustrated in FIG. 3A. The other vehicle 12 in this case may fail to recognize the traffic regulation, "the direction to follow in the right lane G2 is the right to which vehicles should turn when keeping forward in the current lane". The presence of a plurality of preceding vehicles 13 in line further increases the probability that the other vehicle 12 cannot visually recognize or detect the right-turn arrow 14.

The other vehicle 12 can visually recognize or detect the right-turn arrow 14 only after the preceding vehicle 13 passes through the right-turn arrow 14, as illustrated FIG. 3B. Namely, the other vehicle 12 finally recognizes the traffic regulation, "the direction to follow in the right lane G2 is the right to which vehicles should turn when keeping forward in the current lane". The traveling state of the other vehicle 12 (including the behavior of the vehicle) may change before and after the recognition of the traffic regulation. For example, the other vehicle 12 may make an action of coming closer to the lane boundary of the right lane G2, which is a change in position within the right lane G2 in the lane width direction, or may make sudden deceleration, which is an increase in deceleration.

The embodiment is illustrated below with a device and a method of detecting a change in the traveling state of the other vehicle 12 and predicting that the other vehicle 12 makes a lane change from the right lane G2 to the left lane G1 while taking account of a recognition possibility which is a possibility that the other vehicle 12 recognizes the traffic regulation. The device and the method take account of not only the change in the traveling state but also the recognition possibility, so as to prevent an error and a delay in predicting the lane change. An other-vehicle action prediction method and an other-vehicle action prediction device according to the embodiment are described in detail below. The traveling situation illustrated in FIG. 3A and FIG. 3B is an example in which the other-vehicle action prediction method and the other-vehicle action prediction device according to the embodiment effectively function, but does not limit the technical scope of the invention to which the other-vehicle action prediction method and the other-vehicle action prediction device according to the embodiment are applied.

A configuration of the other-vehicle action prediction device according to the embodiment is described below with reference to FIG. 1. The other-vehicle action prediction device includes a control unit. The control unit predicts a lane change of the other vehicle 12 from the adjacent lane G2 to the own lane G1 in front of the host vehicle 11 in accordance with the behavior of the other vehicle 12 traveling in the adjacent lane G2. The control unit includes an object detection unit 102, a host-vehicle position estimation unit 101, a traffic-regulation information acquisition unit 104, and a microcomputer.

The object detection unit 102 includes various kinds of object detection sensors, such as a laser radar, a millimeter-wave radar, a camera, and light direction and ranging (Lidar), mounted on the host vehicle 11 to detect objects around the host vehicle 11. The object detection device 102 detects objects around the host vehicle 11 using the plural object detection sensors. The object detection device 102 detects moving objects such as other vehicles 12 including two-wheeled vehicles, light vehicles including bicycles, and pedestrians, and stationary objects such as parked vehicles. For example, the object detection device 102 detects a position, an attitude, a size, a velocity, acceleration, deceleration, and a yaw rate of a moving object or a stationary object with respect to the host vehicle 11. The position, the attitude (a yaw angle), the size, the velocity, the acceleration, the deceleration, and the yaw rate of each object are collectively referred to below as a "behavior". When the object is the other vehicle 12, the object detection unit 102 detects an actual traveling state of the other vehicle 12 (sometimes simply referred to below as an "actual traveling state") as a behavior of the object.

The object detection unit 102 integrates several detection results obtained by the respective object detection sensors, and outputs a single detection result per object. In particular, the detection unit 102 calculates a behavior of an object, which is the most reasonable and has the least error among pieces of the behavior of the object detected by the respective object detection sensors, in view of error characteristics of the respective object detection sensors. The object detection unit 102 collectively evaluates the detection results obtained by the various sensors by a conventional sensor fusion method, so as to obtain a more accurate detection result for each object.

The object detection unit 102 tracks each detected object. In particular, the object detection unit 102 makes a determination on the sameness (matching) of the object detected at intervals in accordance with the behavior of the object output at different times according to the integrated detection result, and predicts the behavior of the object in accordance with the matching result. The behavior of the object output at different times is stored in a memory in the microcomputer, and is used for the prediction of the action of the other vehicle 12 as described below.

The object detection unit 102 outputs, as the detection result, the behavior of the two-dimensional object in the zenithal view as viewed from the air above the host vehicle 11, for example.

The actual traveling state of the other vehicle 12 is represented by a single value or a combination of two or more values indicating the position including an absolute position and a relative position, the attitude (the yaw angle), the velocity, the acceleration, and the traveling track of the other vehicle 12. The traveling track of the other vehicle 12 refers to time-series positions of the other vehicle 12. For example, the actual traveling state, when represented by the combination of the traveling track and the velocity, includes a profile of the positions of the other vehicle 12 at different times and a profile of the velocities of the other vehicle 12 at the respective positions.

Alternatively, the actual traveling state of the other vehicle 12 can be represented by one of or a combination of two or more of the states of the other vehicle 12 regarding the direction of the other vehicle 12 with respect to the adjacent lane (the right lane G2) or the own lane (the left lane G1), the position of the other vehicle 12 in the adjacent lane in the vehicle width direction, the velocity of the other vehicle 12, the acceleration of the other vehicle 12, and the deceleration of the other vehicle 12. For example, the actual traveling state may be represented by the state of the other vehicle 12, such as "the traveling direction is along the right lane G2", "the traveling direction is curved toward the left lane G1", "the position in the lane width direction is closer to the left lane G1", "accelerating", "decelerating", or "the velocity is constant".

The host-vehicle position estimation unit 101 includes a position detection sensor mounted on the host vehicle 11, such as a reception device which receives global positioning system (GPS) signals, so as to measure a position (an absolute position) and an attitude (an absolute attitude) of the host vehicle 11 in a geographic coordinate system. The host-vehicle position estimation unit 101 further includes a calculation processing circuit implementing odometry and dead reckoning. In particular, the host-vehicle position estimation unit 101 uses a wheel speed sensor for detecting a wheel speed of the respective wheels of the host vehicle 11, a steering angle sensor for detecting an angle of the steering wheel, and the calculation processing circuit, so as to measure the relative position, the relative attitude, and the velocity of the host vehicle 11 with respect to a predetermined reference point. The information on the absolute position, the absolute attitude, the relative position, and the relative attitude of the host vehicle 11 is referred to as "information on the position and the attitude of the host vehicle 11". The host-vehicle position estimation unit 101 can detect the position and the attitude of the host vehicle 11 on a map from the information on the position and the attitude of the host vehicle 11. The map is indicated by map data preliminarily stored in a map database 111.

The traffic-regulation information acquisition unit 104 acquires the information on the traffic regulations (the traffic regulation information) regarding the road around the host vehicle 11. For example, the traffic-regulation information acquisition unit 104 acquires the traffic regulation information regarding the adjacent lane on the left side or the right side of the own lane G1 ahead of the host vehicle 11. The traffic-regulation information acquisition unit 104 can also acquire the traffic regulation information ahead of the other vehicle 12 regarding the adjacent lane (the right lane G2) in which the other vehicle 12 is traveling which is a target for the determination of the lane change. When a target for the determination of the lane change is not specified yet, the traffic-regulation information acquisition unit 104 can acquire the traffic regulation information regarding the adjacent lanes on both sides of the own lane G1, instead of the particular lane. The map data stored in the map database 111 includes the data on the structure of the road having the own lane G1 and the adjacent lane G2 and the data on the structure of the respective lanes of the road. The traffic regulation information regarding the own lane G1 and the adjacent lane G2 linked with the structure of the road is also stored in the map database 111.

The map database 111 may be installed in the host vehicle 11, or is not necessarily installed in the host vehicle 11. When the map database 111 is not installed in the host vehicle 11, the traffic-regulation information acquisition unit 104 may acquire the map data and the traffic regulation information externally through vehicle-to-vehicle communications or road-to-vehicle communications in intelligent transport systems (ITS) or universal traffic management systems (UTMS), or mobile communications such as 3G and LTE.

The traffic-regulation information acquisition unit 104 may recognize road indications indicating the traffic regulations or instructions printed on the road surface of the road from images around the host vehicle 11 acquired by use of the camera included in the object detection unit 102. The traffic-regulation information acquisition unit 104 may recognize traffic signs placed along the road from the images around the host vehicle 11. The traffic-regulation information acquisition unit 104 may recognize lane boundaries printed on the road surface from the images around the host vehicle 11 so as to acquire the lane structure.

The microcomputer predicts that the other vehicle 12 makes a lane change in accordance with the detection result obtained by the object detection unit 102, the estimation result obtained by the host-vehicle position estimation unit 101, and the acquisition information obtained by the traffic-regulation information acquisition unit 104.

The microcomputer is a multi-purpose microcomputer including a central processing unit (CPU), a memory such as RAM and ROM, and an input/output unit. A computer program (an other-vehicle action prediction program) is installed on the microcomputer so as to function as a part of the other-vehicle action prediction device. The microcomputer functions as a plurality of information processing circuits (103, 105, 106, 107, and 108) included in the other-vehicle action prediction device when the computer program is executed. The embodiment is illustrated with the case in which the software is installed to fabricate the plural information processing circuits (103, 105 to 108) included in the other-vehicle action prediction device. Alternatively, dedicated hardware for executing each information processing as described below can be prepared to compose the information processing circuits (103, 105 to 108). The respective information processing circuits (103, 105 to 108) may be composed of individual hardware. The information processing circuits (103, 105 to 108) may also serve as an electronic control unit (ECU) used for executing other control processing regarding the host vehicle 11. The present embodiment is illustrated with a case, as an example, in which the microcomputer also implements information processing circuits (109 and 110) for executing the autonomous driving of the host vehicle 11 in accordance with the prediction results of actions of other vehicles.

The microcomputer includes, as the respective information processing circuits (103, and 105 to 110), a probability-of-action generation unit 103, a rule derivation unit 105, a recognition possibility calculation unit 106, a change-in-traveling state detection unit 107, a predicted-action decision unit 108, a host-vehicle route generation unit 109, and a vehicle control unit 110.

The probability-of-action generation unit 103 predicts a probability of action that the other vehicle 12 would take in the near future, in accordance with the road structure and the lane structure. The probability of action predicted by the probability-of-action generation unit 103 includes a lane change. The probability-of-action generation unit 103 predicts how the other vehicle 12 travels next as an intention of action in accordance with the road structure and the structure of the lane to which the other vehicle 12 belongs, and calculates a primary course of the other vehicle 12 based on the intention of action. As used herein, the term "probability of action" refers to a superordinate concept including the intention of action and the primary course. The term "primary course" encompasses a profile of positions of the other vehicle 12 at different times and also a profile of velocities of the other vehicle 12 at the respective positions.

For example, the probability-of-action generation unit 103 predicts the intention of action that the other vehicle 12 would take to keep traveling in the adjacent lane (the right lane G2) so as to calculate the primary course of traveling along the right lane G2, as illustrated in FIG. 3A. The probability-of-action generation unit 103 also predicts the intention of action that the other vehicle 12 would take to make a lane change from the adjacent lane (the right lane G2) to the own lane (the left lane G1) ahead of the host vehicle 11. The probability-of-action generation unit 103 then calculates the primary course of making a lane change from the right lane G2 to the left lane G1 ahead of the host vehicle 11.

As used in the present embodiment, the "lane change" encompasses a lane change in a traveling situation in which no vehicles are present in line in the own lane G1 in front of the host vehicle 11, which is referred to as a "normal lane change", as illustrated in FIG. 3A. The "lane change" also encompasses an action of breaking in a line in a traveling situation in which vehicles are present in line in the own lane G1 in front of the host vehicle 11, which is referred to as "break-in". The term "break-in" has the same meaning as the term "cut-in".

When the traffic-regulation information acquisition unit 104 acquires the traffic regulation regarding the adjacent lane (the right lane G2) ahead of the other vehicle 12 (at the point at which the other vehicle is reaching later), the rule derivation unit 105 predicts a "predicted traveling state" as a rule which is a traveling state in which the other vehicle 12 travels according to the traffic regulation ahead of the other vehicle 12. The "predicted traveling state" of the other vehicle 12 refers to a traveling state of action that the other vehicle 12 is presumed to take when the other vehicle 12 travels according to the traffic regulation regarding the adjacent lane ahead of the other vehicle 12. The term "traffic regulation" in the following explanations refers to the traffic regulation ahead of the other vehicle 12.

The predicted traveling state of the other vehicle 12 can be represented by a value or a combination of values, as in the case of the actual traveling state. In particular, the predicted traveling state is represented by a single value or a combination of two or more values indicating the position including the absolute position and the relative position, the attitude (the yaw angle), the velocity, the acceleration, and the traveling track of the other vehicle 12. For example, the predicted traveling state, when represented by the combination of the traveling track and the velocity, includes a profile of the positions of the other vehicle 12 at different times and a profile of the velocities of the other vehicle 12 at the respective positions.

Alternatively, the predicted traveling state of the other vehicle 12 can be represented by one of or a combination of the states of the other vehicle 12 regarding the direction of the other vehicle 12 with respect to the adjacent lane (the right lane G2) or the own lane (the left lane G1), the position of the other vehicle 12 in the adjacent lane in the vehicle width direction, the velocity of the other vehicle 12, the acceleration of the other vehicle 12, and the deceleration of the other vehicle 12.

The rule derivation unit 105 may predict the predicted traveling state in accordance with the traffic regulation information, the road structure of the adjacent lane (G2), and the regulation speed on the road of the adjacent lane (G2). In particular, the rule derivation unit 105 calculates the predicted traveling state in which the other vehicle 12 turns to the right at about 90 degrees along the shape of the right lane G2, in accordance with the regulation of the right-turn lane (an example of the traffic regulations) and the shape of the adjacent lane (G2) curved toward the right ahead of the other vehicle 12 (an example of the road structures).

Alternatively, the rule derivation unit 105 may choose the predicted traveling state from a plurality of probabilities of action generated by the probability-of-action generation unit 103. The rule derivation unit 105 can predict a profile of the velocities of the other vehicle 12 by taking account of the regulation speed on the road of the adjacent lane (G2).

The recognition possibility calculation unit 106 calculates a "recognition possibility" indicating a possibility that the other vehicle 12 recognizes the traffic regulations. The term "traffic regulations" as used herein includes at least the traffic regulation regarding the adjacent lane (the right lane G2). Namely, the recognition possibility calculation unit 106 calculates, as the "recognition possibility", the possibility that the other vehicle 12 recognizes the traffic regulation regarding the currently-traveling lane (G2). The recognition possibility does not need to be related directly with the fact of whether the host vehicle 11, namely, the traffic-regulation information acquisition unit 104 acquires the traffic regulation regarding the adjacent lane (the right lane G2), since the recognition possibility indicates the possibility regarding the recognition of the other vehicle 12. Of course, the possibility regarding the recognition of the host vehicle 11 may be associated with the "recognition possibility" of the other vehicle 12, as described below.

For example, the recognition possibility calculation unit 106 can calculate the recognition possibility by use of a maximum recognition range and a partial recognition range, which are examples of several recognition ranges. The term "maximum recognition range" as used herein is a maximum range enabling the other vehicle 12 to recognize the traffic regulation calculated according to visual properties of a human (for example, eyesight of a typical driver) in the case in which the other vehicle 12 is traveling by the manual driving. When the other vehicle 12 is traveling by the autonomous driving, the maximum recognition range is a maximum range capable of recognizing the traffic regulation calculated according to a sensing range of the respective object detection sensors mounted on the other vehicle 12. The maximum recognition range is a range determined depending on the distance from the other vehicle 12, which can be a range of a circle about the host vehicle 12 having a radius which is a distance (indicated by La shown in FIG. 3A) determined depending on the visual properties of a human, for example.

The term "partial recognition range" is a range enabling the other vehicle 12 to recognize the traffic regulation calculated according to the height of the other vehicle 12 and the traveling condition of the other vehicle 12. For example, an object around the other vehicle 12 (an example of the traveling condition) may block a road structure enabling the recognition of the traffic regulation or a mark indicating the traffic regulation such as a traffic sign, because of the low height of the other vehicle 12. The other vehicle 12 in this case cannot visually recognize or detect the road structure or the mark to fail to recognize the traffic regulation. The recognition possibility calculation unit 106 thus takes account of the height of the other vehicle 12 and the traveling condition to calculate the partial recognition range so as not to include the mark indicating the traffic regulation blocked (present in a blind spot). For example, as indicated by the region Lb shown in FIG. 3A, the other vehicle 12 can recognize the traffic regulation in the sensing range at a predetermined angle. The other vehicle 12, however, cannot recognize or detect the traffic regulation in a region blocked by the preceding vehicle 13, which is a blind spot of the other vehicle 12. When the height of the other vehicle 12 is sufficiently higher than the height of the preceding vehicle 13, the region ahead of the preceding vehicle 13 in the traveling direction is not a blind spot of the other vehicle 12. The partial recognition range in such a case is thus wider than the region Lb illustrated in FIG. 3A. The partial recognition range Lb thus can be calculated in accordance with the height of the other vehicle 12 and the traveling condition of the other vehicle 12 (the presence of the preceding vehicle 13). The "partial recognition range" may be decreased around an object (a blocking object) narrowing the recognition range so as not to cause an error in the object detection. Alternatively, the recognition possibility may be calculated in accordance with a blocked rate of the sensing range blocked by the blocking object (a rate of the sensing range of the respective object detection sensors in the case of the presence of the blocking object to the sensing range of the respective object detection sensors in the case of the absence of the blocking object). For example, the recognition possibility R1 may be calculated to be 0.8 when the blocked rate of the sensing range blocked by the preceding vehicle 13 (an example of the blocking object) illustrated in FIG. 3A is 20%.

The recognition possibility calculation unit 106 can calculate the recognition possibility by several kinds of methods using the maximum recognition range (the circle having the radius of La) and the partial recognition range Lb. Specific calculation examples are illustrated below with a first calculation standard to a fifth calculation standard.

(First Calculation Standard)

The recognition possibility calculation unit 106 can obtain a higher recognition possibility in a case in which a road structure enabling the recognition of a traffic regulation or a mark indicating a traffic regulation is included in both the maximum recognition range and the partial recognition range than in a case in which the road structure or the mark is not included in either the maximum recognition range or the partial recognition range. The expression "the road structure or the mark is not included in either the maximum recognition range or the partial recognition range" includes a case in which the road structure or the mark is included in only one of the maximum recognition range and the partial recognition range, and a case in which the road structure or the mark is included in neither the maximum recognition range nor the partial recognition range. The "road structure enabling the recognition of a traffic regulation" includes lane boundaries. For example, the recognition possibility calculation unit 106 can recognize the traffic regulation in accordance with the shape of the lane boundaries such as a straight, a right curve, and a left curve, or in accordance with the type of the lane boundaries such as a white broken line, a white solid line, and a yellow solid line. The "mark indicating a traffic regulation" includes a traffic indication such as a paint on the road surface in front of the other vehicle 12, a road sign (including a traffic sign), and a signboard for guidance, warning labeling, or instruction depending on the condition of the road or traffic. The road sign includes a regulation sign for information of a regulation such as suspension or restriction of passage, and an auxiliary sign for auxiliary information of a reason for a sign installed (such as a type of vehicle, time, and a section).

(Second Calculation Standard)

The recognition possibility calculation unit 106 can obtain a higher recognition possibility in a case in which either a road structure enabling the recognition of a traffic regulation or a mark indicating a traffic regulation is entirely included in the maximum recognition range or the partial recognition range than in a case in which either the road structure or the mark is partly included in the maximum recognition range or the partial recognition range. For example, when part of the right-turn arrow 14 is blocked from view by the preceding vehicle 13, as illustrated in FIG. 3A, the right-turn arrow 14 is partly included in the partial recognition range. When the right-turn arrow 14 is not hidden by the preceding vehicle 13, as illustrated in FIG. 3B, the right-turn arrow 14 is entirely included in the partial recognition range Lb. The recognition possibility in the traveling situation illustrated in FIG. 3B is thus higher than the recognition possibility in the traveling situation illustrated in FIG. 3A.

(Third Calculation Standard)

The recognition possibility calculation unit 106 obtains a higher recognition possibility as a distance from the other vehicle 12 to a road structure enabling the recognition of a traffic regulation or a mark indicating a traffic regulation is shorter. The recognition possibility of the other vehicle 12 increases when an object enabling the recognition of a traffic regulation is close, as compared with a case in which the object is distant. For example, the recognition possibility $R_2$ may be calculated to be 0.9 when the distance is five meters, and the recognition possibility $R_2$ may be calculated to be 0.8 when the distance is eight meters.

The first to third calculation standards described above may be used independently, or may be combined as appropriate. For example, the recognition possibility calculation unit 106 may calculate the recognition possibility R by integrating the recognition possibility $R_1$ based on the blocked rate of the sensing range and the recognition possibility $R_2$ based on the distance according to the formula (1), where $\alpha_1$ and $\beta_1$ are each a weighting coefficient, and K+1 is a correction term, in which K is zero or a positive number. When each of $\alpha_1$, $\beta_1$, and K is one, the recognition possibility $R_1$ and the recognition possibility $R_2$ can be weighted equally. The recognition possibility R can be obtained from a preliminarily designed distribution such as a probability density function of a normal distribution.

[Math. 1]

$$R = \frac{(\alpha_1 R_1 + \beta_1 R_2)}{K + 1} \quad (1)$$

(Fourth Calculation Standard)

The recognition possibility calculation unit 106 can obtain the recognition possibility using, as the maximum recognition range or the partial recognition range, a host-vehicle recognition range enabling the host vehicle 11 to recognize a traffic regulation. Namely, the range that the host vehicle 11 can recognize may be substituted for the maximum recognition range or the partial recognition range of the other vehicle 12 so as to calculate the recognition possibility. The fourth calculation standard can be implemented in combination with the first to third calculation standards.

(Fifth Calculation Standard)

The recognition possibility calculation unit 106 can obtain the recognition possibility in accordance with a road structure enabling the recognition of a traffic regulation or a mark indicating a traffic regulation actually detected by the host vehicle 11. The recognition possibility can be calculated on the assumption that the other vehicle 12 could detect the road structure or the mark that the host vehicle 11 has actually detected. The fifth calculation standard can be implemented in combination with the first to fourth calculation standards.

The change-in-traveling state detection unit 107 detects a change in the actual traveling state detected by the object detection unit 102. In particular, the change-in-traveling state detection unit 107 can detect that the actual traveling state has changed when there is a difference of a first reference value or greater between the actual traveling states at two different times. The change-in-traveling state detection unit 107 does not need to determine the change of the actual traveling state when there is no difference of the first reference value or greater between the actual traveling states at two different times.

Alternatively, the change-in-traveling state detection unit 107 can detect that the actual traveling state has changed when there is a difference of a second reference value or greater between the amounts of change in the actual traveling states per unit time at two different times. The change-in-traveling state detection unit 107 does not need to determine the change of the actual traveling state when there is no difference of the second reference value or greater between the amounts of change in the actual traveling states per unit time at two different times. As described above, the change-in-traveling state detection unit 107 can determine whether the actual traveling state has changed in accordance with the comparison between the actual traveling states at two different times or the comparison between the amounts of change in the actual traveling states per unit time at two different times.

The predicted-action decision unit 108 predicts that the other vehicle 12 makes a lane change in accordance with the recognition possibility calculated by the recognition possibility calculation unit 106, the predicted traveling state predicted by the rule derivation unit 105, and the change in the actual traveling state. The "change in the actual traveling state" is detected by the change-in-traveling state detection unit 107. In particular, the object detection unit 102 acquires the actual traveling state when the change-in-traveling state detection unit 107 detects that the actual traveling state has changed. The "actual traveling state" acquired by the object detection unit 102 is illustrated below with two examples (a first example and a second example).

First Example

The object detection unit 102 acquires the actual traveling state after being changed as an actual traveling state. As described above, the actual traveling state after being changed is represented by a single value or a combination of two or more values indicating the position, the attitude, the velocity, the acceleration, and the traveling track of the other vehicle 12. The actual traveling state after being changed is not necessarily represented by the numerical value, but may be represented by a state related to the numerical value.

Second Example

The object detection unit 102 acquires change information which is information on a change in the traveling state. The change information can be represented by a single value or a combination of two or more values indicating the position, the attitude, the velocity, the acceleration, and the traveling track of the other vehicle 12. Alternatively, the change information may be represented by one of or a combination of two or more of the states of the other vehicle 12 regarding the direction of the other vehicle 12 with respect to the adjacent lane G2 or the own lane G1, the position of the other vehicle 12 in the adjacent lane G2 in the vehicle width direction, the velocity of the other vehicle 12, the acceleration of the other vehicle 12, and the deceleration of the other vehicle 12.

The predicted-action decision unit 108 compares the predicted traveling state which is the traveling state of the other vehicle when traveling according to the traffic regulation (which is the traveling state when not making a lane change) with the actual traveling state, and predicts that the other vehicle 12 makes a lane change in accordance with the comparison result and the recognition possibility. The "comparison result" is illustrated below with three examples (a third example to a fifth example).

Third Example

The predicted-action decision unit 108 compares the predicted traveling state and the actual traveling state, and calculates the amount of deviation of the actual traveling state in a direction not following the predicted traveling state. The expression "amount of deviation of the actual traveling state in a direction not following the predicted traveling state" is as follows. For example, as illustrated in FIG. 3A, when the other vehicle 12 is traveling in the right lane G2, the rule derivation unit 105 predicts a predicted traveling track as a predicted traveling state of traveling in the middle of the right lane G2 in the vehicle width direction. When the actual traveling track (an example of the actual traveling state) detected by the object detection unit 102 is shifted toward the right from the predicted traveling track, the actual traveling state is determined to be displaced in the direction following the predicted traveling track curved toward the right. When the actual traveling track detected by the object detection unit 102 is shifted toward the left from the predicted traveling track, the actual traveling state is determined to deviate in the direction not following the predicted traveling track curved toward the right. In the traveling situation illustrated in FIG. 3A, the predicted-action decision unit 108 calculates the amount of deviation of the actual traveling track deviating from the predicted traveling track toward the left as the "amount of deviation of the actual traveling state in the direction not following the predicted traveling state". The "amount of deviation of the actual traveling state in the direction not following the predicted traveling state" is zero when the actual traveling track is displaced toward the right from the predicted traveling track in the traveling situation illustrated in FIG. 3A. Namely, the amount of deviation is zero in the right-turn lane regardless of the displacement toward the right from the middle of the lane in the vehicle width direction.

The predicted-action decision unit 108 determines whether the other vehicle 12 makes a lane change in accordance with the amount of deviation and the recognition possibility while referring to the table shown in FIG. 4, for example. In particular, the predicted-action decision unit 108 preliminarily sets thresholds ($Th_{a1}$, $Th_{a2}$, $Th_{b1}$, $Th_{b2}$) for each of the amount of deviation and the recognition possibility, and determines whether the other vehicle 12 makes a lane change according to the comparison of the amount of deviation and the recognition possibility with the respective thresholds while referring to the table shown in FIG. 4. The numerical value "1" in FIG. 4 indicates that the other vehicle 12 makes a lane change, and the numerical value "0" indicates that the other vehicle 12 does not make a lane change.

The threshold $Th_{b1}$ set for the recognition possibility is greater than the threshold $Th_{b2}$. The respective thresholds $Th_{b1}$ and $Th_{b2}$ are preliminarily set so as to determine that "the recognition possibility is high (the possibility that the other vehicle recognizes is high)" when the recognition possibility is greater than the threshold $Th_{b1}$, determine that "the recognition possibility is probable (there is a possibility that the other vehicle recognizes)" when the recognition possibility is greater than the threshold $Th_{b2}$, and determine that "the recognition possibility is low (the possibility that the other vehicle does not recognize is high)" when the recognition possibility is less than or equal to the threshold $Th_{b2}$.

The threshold $Th_{a1}$ set for the amount of deviation is greater than the threshold $Th_{a2}$. The respective thresholds $Th_{a1}$ and $Th_{a2}$ are preliminarily set so as to determine that "the amount of deviation is large" when the amount of deviation is greater than the threshold $Th_{a1}$, determine that "the amount of deviation is confirmed (deviation is caused)" when the amount of deviation is greater than the threshold $Th_{a2}$, and determine that "the amount of deviation is not confirmed (there is no deviation)" when the amount of deviation is less than or equal to the threshold $Th_{a2}$.

The predicted-action decision unit 108 predicts that the other vehicle 12 makes a lane change when the recognition possibility is greater than the threshold $Th_{b1}$ (the first threshold) and the amount of deviation is greater than the threshold $Th_a t$ (the second threshold). The predicted-action decision unit 108 predicts that the other vehicle 12 makes a lane change when the recognition possibility is less than or equal to the threshold $Th_{b1}$ (the first threshold) but the amount of deviation is greater than the threshold $Th_{a1}$ (the third threshold). The predicted-action decision unit 108 predicts that the other vehicle 12 does not make a lane change when the recognition possibility is less than or equal to the threshold $Th_{b1}$ (the first threshold) and the amount of deviation is less than or equal to the threshold $Th_{a1}$ (the third threshold).

The predicted-action decision unit 108 predicts that the other vehicle makes a lane change when the amount of deviation is large (the amount of deviation is greater than the threshold $Th_{a1}$) regardless of the recognition possibility, and predicts that the other vehicle makes a lane change when the amount of deviation is detected regardless of whether the amount of deviation is small (when the amount of deviation is greater than the threshold $Th_{a2}$) in the case in which the recognition possibility is high (the recognition possibility is greater than the threshold $Th_{b1}$). The predicted-action decision unit 108 does not predict a lane change of the other vehicle when the amount of deviation is not confirmed (the amount of deviation is less than or equal to the threshold $Th_{a2}$) regardless of the recognition possibility. The predicted-action decision unit 108 does not predict a lane change of the other vehicle when the amount of deviation is confirmed but is not large (when the amount of deviation is greater than the threshold $Th_{a2}$ but is less than or equal to the threshold $Th_{a1}$) in the case in which the recognition possibility is not high (the recognition possibility is less than or equal to the threshold $Th_{b1}$). Namely, the predicted-action decision unit 108 predicts that the other vehicle makes a lane change when the amount of deviation is large (the amount of deviation is greater than the threshold $Th_{a1}$) regardless of the recognition possibility, and predicts that the other vehicle makes a lane change when the amount of deviation is small but at least detected (when the amount of deviation is greater than the threshold $Th_{a2}$) when the recognition possibility is high (the recognition possibility is greater than the threshold $Th_{b1}$).

When two or more of the values are combined to represent the actual traveling state or the predicted traveling state, the respective values are preferably compared with the thresholds according to the table shown in FIG. 4. The determination results for the respective values may be integrated so as to determine whether the other vehicle makes a lane change.

Fourth Example

The predicted-action decision unit 108 compares the predicted traveling state which is the traveling state of the other vehicle when traveling according to the traffic regulation (the traveling state when not making a lane change) with the actual traveling state of the other vehicle, and calculates discrepancy in the actual traveling state in the direction not following the predicted traveling state. For example, the predicted-action decision unit 108 may calculate the discrepancy d according to the formula (2), where v is the actual traveling state, r is the predicted traveling state, and μ and σ are each a predetermined constant. For example, μ and σ are each an average or a standard deviation of differences between the predicted traveling state and the actual traveling state. The predicted-action decision unit 108 calculates a value standardized according to the formula (2) as the discrepancy d.

[Math. 2]

$$d = \frac{\sqrt{(v-r)^2} - \mu}{\sigma} \qquad (2)$$

The explanation of a case is made below in which the predicted traveling state and the actual traveling state are each represented by one of or a combination of two or more of the states of the other vehicle 12 regarding the direction of the other vehicle 12 with respect to the adjacent lane G2 or the own lane G1, the position of the other vehicle 12 in the adjacent lane G2 in the vehicle width direction, the velocity of the other vehicle 12, the acceleration of the other vehicle 12, and the deceleration of the other vehicle 12. The predicted-action decision unit 108 can calculate as the discrepancy whether the predicted traveling state and the actual traveling state conform to each other. In particular, the predicted-action decision unit 108 determines as the discrepancy whether the states representing the predicted traveling state and the actual traveling state conform to or differ from each other. When the predicted traveling state and the actual traveling state are each represented by a combination of two or more of the states, the predicted-action decision unit 108 can determine the discrepancy for each of the states, and integrate the determination results of the discrepancy for the respective states, so as to obtain a single discrepancy. The discrepancy may be defined by a plurality of levels. For example, in the case in which the predicted traveling state (a degree of acceleration) is "decelerating", the discrepancy may be set to "1" when the actual traveling state (a degree of acceleration) is "accelerating", the discrepancy may be set to "0.5" when the actual traveling state is "slow-moving", and the discrepancy may be set to "0" when the actual traveling state is "decelerating".

The predicted-action decision unit 108 then determines whether the other vehicle 12 makes a lane change in accordance with the discrepancy and the recognition possibility while referring to the table shown in FIG. 5, for example. In particular, the predicted-action decision unit 108 preliminarily sets thresholds ($Th_{d1}$, $Th_{d2}$, $Th_{b1}$, $Th_{b2}$) for each of the discrepancy and the recognition possibility. The predicted-action decision unit 108 determines whether the other vehicle 12 makes a lane change according to the comparison of the discrepancy and the recognition possibility with the respective thresholds while referring to the table shown in FIG. 5. The numerical value "1" in FIG. 5 indicates that the other vehicle 12 makes a lane change, and the numerical value "0" indicates that the other vehicle 12 does not make a lane change. The respective thresholds $Th_{b1}$ and $Th_{b2}$ of the recognition possibility are preliminarily set so as to determine whether "the recognition possibility is high" or "the recognition possibility is low", as described above. The respective thresholds $Th_{d1}$ and $Th_{d2}$ of the discrepancy are preliminarily set so as to determine that "the discrepancy is high (the difference is large)" when the discrepancy is greater than the threshold $Th_{d1}$, and determine that "the discrepancy is confirmed (the difference is caused)" when the discrepancy is greater than the threshold $Th_{d2}$.

The predicted-action decision unit 108 predicts that the other vehicle 12 makes a lane change when the recognition possibility is greater than the threshold $Th_{b1}$ (the fourth threshold) and the discrepancy is greater than the threshold $Th_{d2}$ (the fifth threshold). The predicted-action decision unit 108 predicts that the other vehicle 12 makes a lane change when the recognition possibility is less than or equal to the threshold $Th_{b1}$ (the fourth threshold) but the discrepancy is greater than the threshold $Th_{d1}$ (the sixth threshold). The predicted-action decision unit 108 predicts that the other vehicle 12 does not make a lane change when the recognition possibility is less than or equal to the threshold $Th_{b1}$ and the discrepancy is less than or equal to the threshold $Th_{d1}$.

The predicted-action decision unit 108 predicts that the other vehicle makes a lane change when the discrepancy is high (the discrepancy is greater than the threshold $Th_{d1}$) regardless of the recognition possibility, and predicts that the other vehicle makes a lane change when the discrepancy is detected regardless of whether the discrepancy is small (when the discrepancy is greater than the threshold $Th_{d2}$) in the case in which the recognition possibility is high. The predicted-action decision unit 108 does not predict a lane change of the other vehicle when the discrepancy is not confirmed (the discrepancy is less than or equal to the threshold $Th_{d2}$) regardless of the recognition possibility. The predicted-action decision unit 108 does not predict a lane change of the other vehicle when the discrepancy is confirmed but is not large (when the discrepancy is greater than the threshold $Th_{d2}$ but is less than or equal to the threshold $Th_{d1}$) in the case in which the recognition possibility is not high (the recognition possibility is less than or equal to the threshold $Th_{b1}$). Namely, the predicted-action decision unit 108 predicts that the other vehicle makes a lane change when the discrepancy is large (the discrepancy is greater than the threshold $Th_{d1}$) regardless of the recognition possibility, and predicts that the other vehicle makes a lane change when the discrepancy is small but at least confirmed (when the discrepancy is greater than the threshold That) when the recognition possibility is high (the recognition possibility is greater than the threshold $Th_{b1}$).

When two or more of the states are combined to represent the actual traveling state or the predicted traveling state, the respective states are preferably compared with the thresholds according to the table shown in FIG. 5. The determination results for the respective states may be integrated so as to determine whether the other vehicle makes a lane change.

Fifth Example

The predicted-action decision unit 108 compares the predicted traveling state which is the traveling state of the other vehicle when traveling according to the traffic regulation (the traveling state when not making a lane change) with the actual traveling state of the other vehicle, and calculates a "lane change probability" indicating a probability that the other vehicle 12 makes a lane change. In particular, the predicted-action decision unit 108 calculates the lane change probability according to the "amount of deviation" and the "discrepancy" described above.

For example, the predicted-action decision unit 108 calculates a vector (a state variable vector) composed of at least a position and an attitude of the other vehicle 12 for each of the predicted traveling state and the actual traveling state. A velocity or a rate of acceleration/deceleration of the other vehicle 12 may be added to the state variable vector. The predicted-action decision unit 108 calculates, as a distance e, the amount of deviation between the predicted traveling state (the state variable vector) and the actual traveling state (the state variable vector). The predicted-action decision unit 108 can calculate the lane change probability according to a probability distribution f(e) having the distance e as its input. The predicted-action decision unit 108 calculates a higher lane change probability as the amount of deviation (the distance e) is greater.

Alternatively, the predicted-action decision unit 108 may calculate the lane change probability $P_d$ by substituting the discrepancy d calculated according to the formula (2) into the formula (3). In the formula (3), N is the number of the states combined for representing each of the predicted traveling state and the actual traveling state. The lane change probability $P_d$ can be calculated by an average of the number of N of the discrepancies $d_n$ calculated for the respective states. The greater discrepancy $d_n$ can lead to the higher lane change probability $P_d$ according to the formula (3).

[Math. 3]

$$P_d = \sum_{n=0}^{N} \frac{d_n}{N} \quad (3)$$

Alternatively, the predicted-action decision unit 108 may calculate the lane change probability P in accordance with the result of the comparison between the predicted traveling state and the actual traveling state, and the recognition possibility R. In particular, the predicted-action decision unit 108 can use the lane change probability $P_d$ calculated according to the formula (3) as the "result of the comparison between the predicted traveling state and the actual traveling state". Namely, the predicted-action decision unit 108 may calculate the lane change probability P in accordance with the lane change probability $P_d$ and the recognition possibility R. The predicted-action decision unit 108, of course, can use the "amount of deviation of the actual traveling state in the direction not following the predicted traveling state" and the discrepancy d calculated according to the formula (3) as the "result of the comparison between the predicted traveling state and the actual traveling state".

For example, the predicted-action decision unit 108 can calculate the lane change probability P by substituting the lane change probability $P_d$ and the recognition possibility R into the formula (4). The lane change probability P thus can be calculated in view of the recognition possibility R. In the formula (4), $\alpha_2$ and $\beta_2$ are weighting coefficients for the lane change probability $P_d$ and the recognition possibility R.

[Math. 4]

$$P = \alpha_2 \cdot P_d + \beta_2 \cdot R \qquad (4)$$

Alternatively, the predicted-action decision unit 108 may calculate the lane change probability P in accordance with the lane change probability $P_d$ and the recognition possibility R while referring to the table shown in FIG. 6, instead of the use of the formula (4). The respective numerical values in the table shown in FIG. 6 indicate the lane change probability P. In particular, the predicted-action decision unit 108 preliminarily sets two thresholds (for example, 0.8 and 0.4) for each of the lane change probability $P_d$ and the recognition possibility. The predicted-action decision unit 108 compares the lane change probability $P_d$ and the recognition possibility with the respective thresholds, and classifies each of the lane change probability $P_d$ and the recognition possibility R into three levels (high, middle, low). The predicted-action decision unit 108 then applies the classification of the lane change probability $P_d$ and the recognition possibility to the table shown in FIG. 6 so as to determine the lane change probability P. The predicted-action decision unit 108 leads to a high lane change probability P ("0.8", "0.6" in FIG. 6) when the recognition possibility R is high (for example, "high" in FIG. 6) even though the lane change probability $P_d$ is low (for example, "middle" or "low" in FIG. 6) because the "amount of deviation" or the "discrepancy" is low.

In the fifth example, the predicted-action decision unit 108 can obtain a higher lane change probability in the order of a signboard, a filter traffic light, a road-surface sign, and a road structure including section lines, which are marks indicating the traffic regulations. For example, a weighting coefficient γ regarding the type of mark may be added to the formula (4), as shown in the respective formulae (5) to (7). In the formulae (5) to (7), γ is 1.0 for a signboard, 1.1 for a filter traffic light, 1.2 for a road-surface sign, and 1.3 for a road structure.

[Math. 5]

$$P = (\alpha_2 \cdot P_d + \beta_2 \cdot R) \cdot \gamma \qquad (5)$$

$$P = \alpha_2 \cdot P_d \gamma + \beta_2 \cdot R \qquad (6)$$

$$P = \alpha_2 \cdot P_d + \beta_2 \cdot R \gamma \qquad (7)$$

In the third example to the fifth example described above, the predicted-action decision unit 108 may calculate the lane change probability by use of an actual traveling state of a third vehicle traveling in the adjacent lane G2 excluding the other vehicle 12, as an alternative of the predicted traveling state. In other words, the predicted-action decision unit 108 may calculate the "amount of deviation" or the "discrepancy" from the other vehicle 12 or the "lane change probability", based on the third vehicle traveling in the same lane (the adjacent lane G2) as the other vehicle 12. In particular, the object detection unit 102 acquires the actual traveling state of the third vehicle traveling in the adjacent lane G2 excluding the other vehicle 12. For example, as illustrated in FIG. 3A, the object detection unit 102 acquires the actual traveling state of the preceding vehicle 13 traveling in front of the other vehicle 12. The predicted-action decision unit 108 then compares the actual traveling state of the third vehicle with the actual traveling state of the other vehicle 12, so as to calculate the "amount of deviation", the "discrepancy", or the "lane change probability".

For example, in the fifth example for calculating the "lane change probability P", the predicted-action decision unit 108 can calculate the lane change probability P according to the formula (8). The formula (8) is a formula in which the term of the lane change probability $P_v$ calculated by use of the actual traveling state of the third vehicle is added to the right side of the formula (4). The method of calculating the lane change probability in accordance with the "amount of deviation" or the "discrepancy" described in the fifth example may be applied to the method of calculating the "lane change probability $P_v$".

The predicted-action decision unit 108 can calculate the lane change probability P by substituting the lane change probability $P_d$, the recognition possibility R, and the lane change probability $P_v$ into the formula (8). The lane change probability P thus can be calculated in view of not only the recognition possibility R but also the lane change probability $P_v$ calculated by use of the actual traveling state of the third vehicle. In the formula (8), $\alpha_2$, $\beta_2$, and ε are weighting coefficients for the lane change probability $P_d$, the recognition possibility R, and the lane change probability $P_v$. For example, α2=0.25, β2=0.5, and ε=0.25.

[Math. 6]

$$P = \alpha_2 \cdot P_d + \beta_2 \cdot R + \varepsilon P_v, \qquad (8)$$

The predicted-action decision unit 108 compares the calculated lane change probability P with a predetermined threshold (a ninth threshold) to determine whether the other vehicle 12 makes a lane change. The predicted-action decision unit 108 predicts that the other vehicle 12 makes a lane change when the lane change probability is greater than the predetermined threshold (the ninth threshold). The predicted-action decision unit 108 may determine that the other vehicle 12 does not make a lane change when the lane change probability is less than or equal to the predetermined threshold (the ninth threshold).

The predicted-action decision unit 108 may determine the lane change probability by use of a plurality of different reference values so as to control the vehicle distance between the host vehicle 11 and the other vehicle 12 or the velocity of the host vehicle 11 in a multi-step manner. In particular, the predicted-action decision unit 108 preliminarily prepares a plurality of predetermined thresholds (seventh thresholds) in a multi-step manner. The predicted-action decision unit 108 then compares the respective predetermined thresholds with the lane change probability so as to determine whether the other vehicle 12 makes a lane change in a multi-step manner. This enables the multi-step control for the host vehicle 11 so as to ensure the safety for the lane change of the other vehicle 12.

The host-vehicle route generation unit 109 can generate a route of the host vehicle 11 in accordance with the action of the other vehicle 12 predicted by the predicted-action decision unit 108. The host-vehicle route generation unit 109 can generate the route in view of the lane change of the other vehicle 12 to the own lane G1 when the other vehicle 12 is predicted to make a lane change. This provides the route that the host vehicle 11 can follow smoothly while keeping a sufficient distance from the other vehicle 12 and avoiding sudden deceleration or quick steering of the host vehicle 11 in response to the action of the other vehicle 12. The "route of the host vehicle 11" indicates not only a profile of the positions of the other vehicle 11 at different times but also a profile of the velocities of the other vehicle 11 at the respective positions. The host-vehicle route generation unit 109 generates the route of the own vehicle 11 depending on the lane change. The host-vehicle route generation unit 109 may generate the route such that the relative distance of the other vehicle 12 with respect to the host vehicle 11 is large. When several vehicles are present in line in front of the host vehicle 11, the host-vehicle route generation unit 109 may calculate the route of the host vehicle 11 such that the host vehicle 11 decelerates so as to provide a space for allowing the other vehicle 12 to cut into the line of the vehicles. This can control the host vehicle 11 more safely.

The vehicle control unit 110 drives at least one of a steering actuator, an acceleration pedal actuator, and a brake pedal actuator in accordance with its own position calculated by the host-vehicle position estimation unit 101 so that the host vehicle 11 can travel to follow the route generated by the host-vehicle route generation unit 109. While the embodiment is illustrated with the case in which the host vehicle 11 is controlled in accordance with the generated route, the host vehicle 11 may be controlled without generating the route of the host vehicle 11. In such a case, the host vehicle 11 can be controlled according to the relative distance to the other vehicle 12 or a difference in the attitude angle between the other vehicle 12 and the host vehicle 11. When determining whether the other vehicle 12 makes a lane change in a multi-step manner, the vehicle control unit 110 can execute the multi-step control for the host vehicle 11 so as to ensure the safety for the lane change of the other vehicle 12. Alternatively, the vehicle control unit 110 may control the distance between the host vehicle 11 and the other vehicle 12 and the velocity of the host vehicle 11 while using the value of the lane change probability itself.

Figure 1:
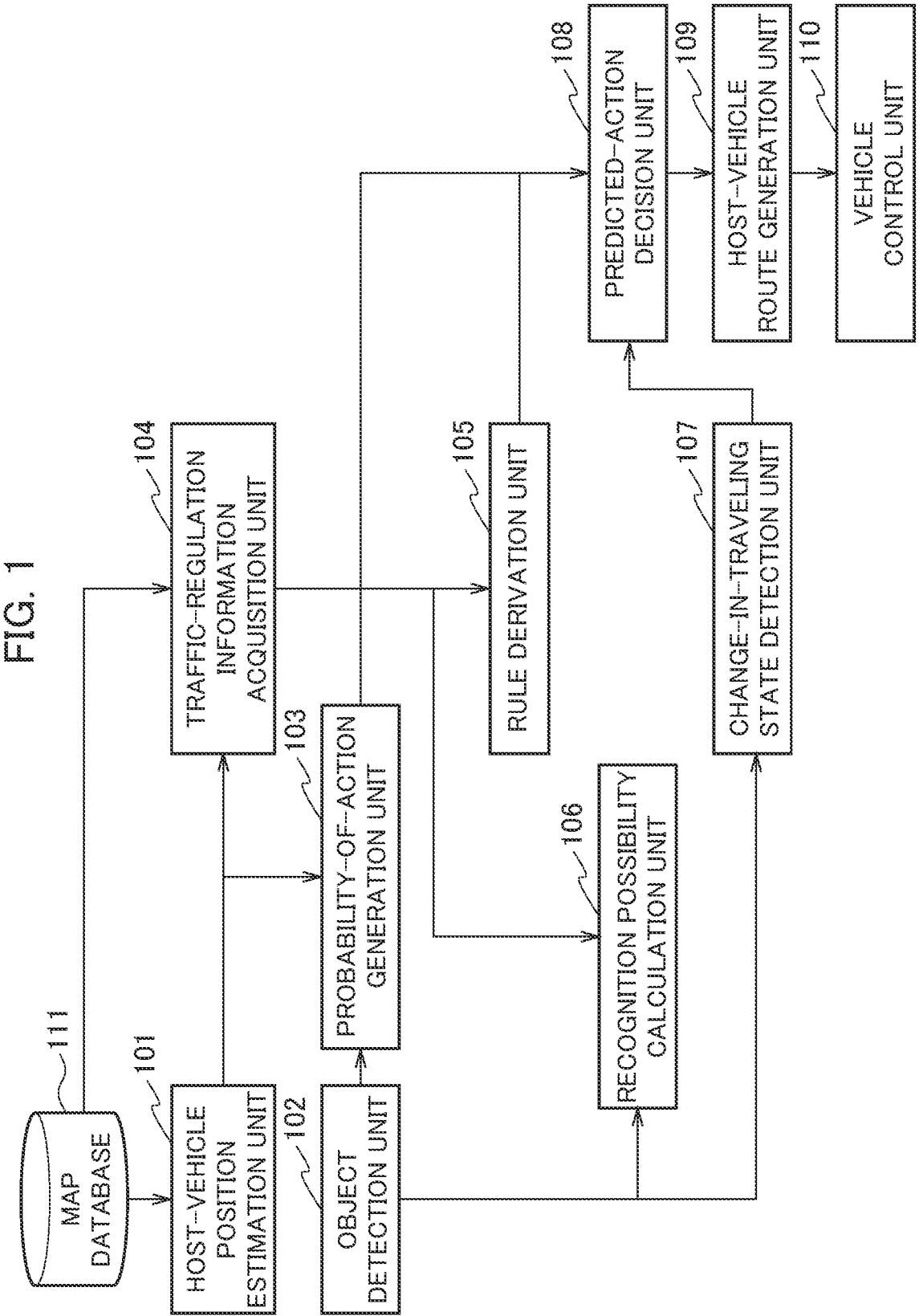
FIG. 1 is a block diagram illustrating a configuration of an other-vehicle action prediction device according to an embodiment.
Figure 2:
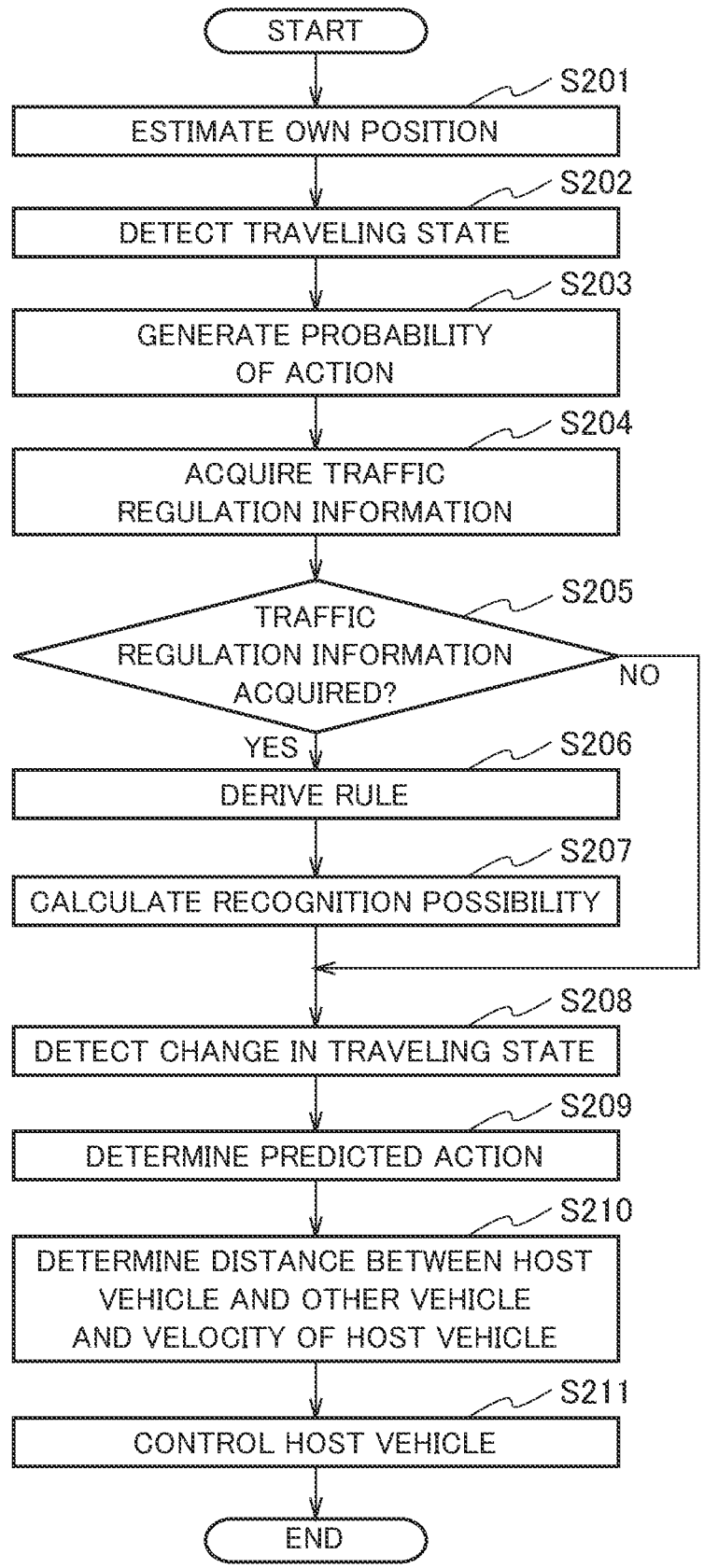
FIG. 2 is a flowchart illustrating an example of operation of the other-vehicle action prediction device shown in FIG. 1 as an other-vehicle action prediction method according to the embodiment.

An example of operation of the other-vehicle action prediction device illustrated in FIG. 1 is described below as the other-vehicle action prediction method according to the embodiment with reference to FIG. 2. The process shown in FIG. 2 is repeated at predetermined intervals during a period from which an ignition switch of the host vehicle 11 is turned on (the power supply is turned on in a case of an electric vehicle) to which the ignition switch is turned off. The control flowchart shown in FIG. 2 is executed on the presumption that the host vehicle 11 is traveling by the autonomous driving.

In step S201, the host-vehicle position estimation unit 101 measures the own position (the absolute position and the relative position) of the host vehicle 11. The host-vehicle position estimation unit 101 then detects the position and the attitude of the host vehicle 11 on the map. The process proceeds to step S202, and the object detection unit 102 acquires the actual traveling state of the other vehicle 12. In particular, the object detection unit 102 detects the other vehicle 12 by use of the respective object detection sensors so as to track the other vehicle 12. The object detection unit 102 outputs the actual traveling state of the other vehicle 12 as the detection result in the zenithal view as viewed from the air above the host vehicle 11, for example.

The process proceeds to step S203, and the probability-of-action generation unit 103 predicts a probability of action that the other vehicle 12 would take in the near future, in accordance with the road structure and the lane structure. The probability of action includes a lane change. The process proceeds to step S204, and the traffic-regulation information acquisition unit 104 acquires the information on the traffic regulations (the traffic regulation information) regarding the road around the host vehicle 11. The traffic-regulation information acquisition unit 104 may acquire the traffic regulation information on the road around the host vehicle 11 particularly regarding the adjacent lane (the right lane G2) in which the other vehicle 12 is traveling as a determination target for a lane change. The traffic-regulation information acquisition unit 104 can acquire the traffic regulation information according to the map data or the analysis of images around the host vehicle 11.

When the traffic regulation information cannot be acquired (NO in step S205), the process proceeds to step S208. When the traffic regulation information can be acquired (YES in step S205), the process proceeds to step S206, and the rule derivation unit 105 predicts the "predicted traveling state" as a rule which is the traveling state in which the other vehicle 12 travels according to the traffic regulation. The process proceeds to step S207, and the recognition possibility calculation unit 106 calculates the "recognition possibility" indicating the possibility that the other vehicle 12 recognizes the traffic regulation. The "traffic regulation" as used herein includes at least the traffic regulation regarding the adjacent lane (the right lane G2) in which the other vehicle 12 is traveling.

The process proceeds to step S208, and the change-in-traveling state detection unit 107 detects a change in the actual traveling state of the other vehicle 12 detected by the object detection unit 102. In particular, the change-in-traveling state detection unit 107 determines whether the actual traveling state has changed in accordance with the comparison between the actual traveling states at two different times or the comparison between the amounts of change in the actual traveling states per unit time at two different times.

The process proceeds to step S209, and the predicted-action decision unit 108 predicts that the other vehicle 12 makes a lane change in accordance with the recognition possibility calculated by the recognition possibility calculation unit 106, the predicted traveling state predicted by the rule derivation unit 105, and the change in the actual traveling state.

The process proceeds to step S210, and the host-vehicle route generation unit 109 generates a route of the host vehicle 11 in accordance with the action of the other vehicle 12 predicted in step S209. The host-vehicle route generation unit 109 generates the route in view of the lane change of the other vehicle 12 to the own lane G1 when the other vehicle 12 is predicted to make a lane change. The host-vehicle route generation unit 109 determines the relative distance of the other vehicle 12 with respect to the host vehicle 11, so as to determine the track and the velocity of the host vehicle 11 necessary for keeping the relative distance as the route of the host vehicle 11.

The process proceeds to step S211, and the vehicle control unit 110 drives the respective actuators in accordance with the own position calculated by the host-vehicle position estimation unit 101 so that the host vehicle 11 travels to follow the route generated in step S210. The vehicle control unit 110 may control the host vehicle 11 without generating the route of the host vehicle 11.

As described above, the embodiment can achieve the following operational effects.

The predicted-action decision unit 108 predicts that the other vehicle 12 makes a lane change in accordance with the recognition possibility of the other vehicle 12, the predicted traveling state derived from the traffic regulation ahead of the other vehicle 12, and the change in the actual traveling state of the other vehicle 12. The change in the traveling state is highly presumed to be a preparatory action that the other vehicle 12 wants to make for the following action (a lane change) due to the recognition of the traffic regulation when the change in the traveling state of the other vehicle 12 is small but the recognition possibility is high. In other words, the probability is high that the traveling state of the other vehicle 12 (including the behavior of the vehicle) has changed before and after the recognition of the traffic regulation. This enables the predicted-action decision unit 108 to predict the lane change at an early stage, so as to avoid a delay in predicting the lane change. In addition, the predicted-action decision unit 108 determines the lane change in accordance with the actual traveling state and the predicted traveling state, which enables the accurate prediction of the lane change of the other vehicle 12. This can further avoid deceleration of the host vehicle 11 due to a wrong prediction, and sudden deceleration of the host vehicle 11 due to a delay in prediction.

The predicted traveling state can be represented by a single value or a combination of two or more values regarding the position including the absolute position and the relative position, the attitude (the yaw angle, the vehicle axis direction), the velocity, the acceleration, and the traveling track of the other vehicle 12. This can avoid an error and a delay in predicting the action of the other vehicle 12.

Alternatively, the predicted traveling state can be represented by one of or a combination of two or more of the states of the other vehicle 12 regarding the direction of the other vehicle 12 with respect to the adjacent lane (the right lane G2) or the own lane (the left lane G1), the position of the other vehicle 12 in the adjacent lane in the vehicle width direction, the velocity of the other vehicle 12, the acceleration of the other vehicle 12, and the deceleration of the other vehicle 12. This can avoid an error and a delay in predicting the action of the other vehicle 12.

The rule derivation unit 105 predicts the predicted traveling state in accordance with the traffic regulation information, the road structure of the adjacent lane (G2), and the regulation speed on the road of the adjacent lane (G2). This can avoid an error and a delay in predicting the action of the other vehicle 12.

The recognition possibility calculation unit 106 calculates the recognition possibility by use of the maximum recognition range and the partial recognition range. This can improve the accuracy of calculating the recognition possibility. Further, the determination of the recognition possibility based on a typical driver can be available. This also enables the determination of the presence or absence of a blocking object in the surroundings such as peripheral vehicles or construction.

The recognition possibility calculation unit 106 calculates a higher recognition possibility in the case in which the road structure enabling the recognition of the traffic regulation or the mark indicating the traffic regulation is included in both the maximum recognition range and the partial recognition range than in the case in which the road structure or the mark is not included in either the maximum recognition range or the partial recognition range. This improves the accuracy of calculating the recognition possibility.

The recognition possibility calculation unit 106 calculates a higher recognition possibility in the case in which either the road structure enabling the recognition of the traffic regulation or the mark indicating the traffic regulation is entirely included in the maximum recognition range or the partial recognition range than in the case either the road structure or the mark is partly included in the maximum recognition range or the partial recognition range. This improves the accuracy of calculating the recognition possibility.

The recognition possibility calculation unit 106 calculates a higher recognition possibility as the distance from the other vehicle 12 to the road structure enabling the recognition of the traffic regulation or the mark indicating the traffic regulation is shorter. For example, as illustrated in FIG. 3B, the recognition possibility calculation unit 106 calculates a higher recognition possibility as the distance H1 from the other vehicle 12 to the right-turn arrow 14 is shorter. This improves the accuracy of calculating the recognition possibility.

The recognition possibility calculation unit 106 calculates the recognition possibility using, as the maximum recognition range or the partial recognition range, the host-vehicle recognition range enabling the host vehicle 11 to recognize the traffic regulation. This improves the accuracy of calculating the recognition possibility.

The recognition possibility calculation unit 106 calculates the recognition possibility in accordance with the road structure enabling the recognition of the traffic regulation or the mark indicating the traffic regulation actually detected by the host vehicle 11. This improves the accuracy of calculating the recognition possibility.

When detecting a change in the actual traveling state (in step S208 in FIG. 2), the object detection unit 102 acquires the actual traveling state in step S209 in FIG. 2. This enables the accurate acquisition of the "actual traveling state", so as to predict the action of the other vehicle 12 with a high accuracy.

The change-in-traveling state detection unit 107 determines whether the actual traveling state has changed in accordance with the comparison between the actual traveling states at two different times or the comparison between the amounts of change in the actual traveling states per unit time at two different times. The change-in-traveling state detection unit 107 thus can detect the change in the actual traveling state with a high accuracy.

The object detection unit 102 acquires the actual traveling state after being changed as an actual traveling state. The actual traveling state after being changed is represented by a single value or a combination of two or more values indicating the position, the attitude, the velocity, the acceleration, and the traveling track of the other vehicle 12. This can avoid an error and a delay in predicting the action of the other vehicle 12.

The object detection unit 102 acquires the change information which is the information on a change in the traveling state. The change information can be represented by a single value or a combination of two or more values indicating the position, the attitude, the velocity, the acceleration, and the traveling track of the other vehicle 12. Alternatively, the change information may be represented by one of or a combination of two or more of the states of the other vehicle 12 regarding the direction of the other vehicle 12 with respect to the adjacent lane G2 or the own lane G1, the position of the other vehicle 12 in the adjacent lane G2 in the vehicle width direction, the velocity of the other vehicle 12, the acceleration of the other vehicle 12, and the deceleration of the other vehicle 12. This can detect the actual traveling state with a high accuracy.

The predicted-action decision unit 108 compares the predicted traveling state and the actual traveling state, and predicts that the other vehicle 12 makes a lane change in accordance with the comparison result and the recognition possibility. This can avoid an error and a delay in predicting the action of the other vehicle 12.

The predicted-action decision unit 108 predicts that the other vehicle 12 makes a lane change when the recognition possibility is greater than the threshold $Th_{b1}$ (the first threshold) and the amount of deviation is greater than the threshold $Th_{a2}$ (the second threshold). The predicted-action decision unit 108 predicts that the other vehicle 12 makes a lane change when the recognition possibility is less than or equal to the threshold $Th_{b1}$ (the first threshold) but the amount of deviation is greater than the threshold $Th_{a1}$ (the third threshold). This can avoid an error and a delay in predicting the action of the other vehicle 12.

The predicted-action decision unit 108 predicts that the other vehicle 12 makes a lane change when the recognition possibility is greater than the threshold $Th_{b1}$ (the fourth threshold) and the discrepancy is greater than the threshold $Th_{d2}$ (the fifth threshold). The predicted-action decision unit 108 predicts that the other vehicle 12 makes a lane change when the recognition possibility is less than or equal to the threshold $Th_{b1}$ (the fourth threshold) but the discrepancy is greater than the threshold $Th_{d1}$ (the sixth threshold). This can avoid an error and a delay in predicting the action of the other vehicle 12.

The predicted-action decision unit 108 compares the predicted traveling state with the actual traveling state so as to calculate the "lane change probability" indicating the probability that the other vehicle 12 makes a lane change. The predicted-action decision unit 108 compares the calculated lane change probability with the predetermined threshold (the seventh threshold) so as to determine whether the other vehicle 12 makes a lane change. This can avoid an error and a delay in predicting the action of the other vehicle 12.

The predicted-action decision unit 108 calculates a higher lane change probability as the amount of deviation (the distance e) is greater. This can calculate the lane change probability with a high accuracy.

The predicted-action decision unit 108 calculates a higher lane change probability $P_d$ as the discrepancy $d_n$ is greater according to the formula (3). This can calculate the lane change probability with a high accuracy.

The predicted-action decision unit 108 calculates the lane change probability P in accordance with the result of the comparison between the predicted traveling state and the actual traveling state and the recognition possibility R according to the formula (4) or the table shown in FIG. 6. This can calculate the lane change probability with a high accuracy.

The predicted-action decision unit 108 calculates a higher lane change probability in the order of a signboard, a filter traffic light, a road-surface sign, and a road structure including section lines, which are marks indicating the traffic regulations. This can calculate the lane change probability with a high accuracy. This calculation can particularly predict a sudden cut-in of the other vehicle 12 accurately and promptly.

The predicted-action decision unit 108 calculates the lane change probability by use of the actual traveling state of a third vehicle traveling in the adjacent lane G2 excluding the other vehicle 12, as an alternative of the predicted traveling state. The predicted-action decision unit 108 can determine the "amount of deviation" or the "discrepancy" not perfunctorily according to the traffic regulations but on the basis of the actual action of the third vehicle. This enables an accurate and flexible determination of the lane change probability, instead of the perfunctory manner based on the traffic regulations.

The predicted-action decision unit 108 determines the lane change probability by use of a plurality of different reference values so as to control the vehicle distance between the host vehicle 11 and the other vehicle 12 or the velocity of the host vehicle 11 in a multi-step manner. This enables the multi-step control for the host vehicle 11 so as to ensure the safety for the lane change of the other vehicle 12.

The respective functions described in the above embodiment can be implemented in single or plural processing circuits. The respective processing circuits include a programmed processing device, such as a processing device including an electric circuit. The processing device includes an application-specific integrated circuit (ASIC) configured to execute the functions described in the embodiment and conventional circuit components.

The embodiment described above is an example of the present invention. It should be understood that the present invention is not intended to be limited to the embodiment described above, and various modifications are apparent to those skilled in the art depending on the design without departing from the technical idea of the present invention. For example, while FIG. 3A and FIG. 3B are illustrated with the traveling situation in which the host vehicle is traveling straight and the other vehicle is traveling in the right-turn lane, the present invention is not limited to this example, and may be applicable to a case in which the host vehicle is traveling straight and the other vehicle is traveling in the left-turn lane.

REFERENCE SIGNS LIST

11 HOST VEHICLE
12 OTHER VEHICLE
14 RIGHT-TURN ARROW (MARK INDICATING TRAFFIC REGULATION)
G1 OWN LANE
G2 ADJACENT LANE
H1 DISTANCE
La MAXIMUM RECOGNITION RANGE
Lb PARTIAL RECOGNITION RANGE

The invention claimed is:

1. An other-vehicle action prediction method of an other-vehicle action prediction device for predicting that another vehicle traveling in an adjacent lane adjacent to an own lane in which a host vehicle is traveling makes a lane change from the adjacent lane to the own lane in front of the host vehicle in accordance with a behavior of the other vehicle, the method comprising:
   acquiring an actual traveling state of the other vehicle;
   acquiring traffic regulation information as information on a traffic regulation regarding the adjacent lane ahead of the other vehicle;
   predicting a predicted traveling state which is a traveling state of the other vehicle when traveling according to the traffic regulation;
   calculating a recognition possibility indicating a possibility that the other vehicle recognizes the traffic regulation by use of a recognition range which is a range enabling the other vehicle to recognize the traffic regulation;
   comparing the predicted traveling state with the actual traveling state;
   predicting that the other vehicle makes the lane change in accordance with a comparison result and the recognition possibility;
   generating a route of the host vehicle based on predicting that the other vehicle makes the lane change; and
   autonomously controlling the host vehicle to travel the generated route.

2. The other-vehicle action prediction method according to claim 1, wherein the predicted traveling state is represented by one of or a combination of two or more of values indicating a position, an attitude, a velocity, acceleration, and a traveling track of the other vehicle.

3. The other-vehicle action prediction method according to claim 1, wherein the predicted traveling state is represented by one of or a combination of two or more of states of the other vehicle regarding a direction of the other vehicle with respect to the adjacent lane or the own lane, a position of the other vehicle in the adjacent lane in a vehicle width direction, a velocity of the other vehicle, acceleration of the other vehicle, and deceleration of the other vehicle.

4. The other-vehicle action prediction method according to claim 1, further comprising predicting the predicted traveling state in accordance with the traffic regulation information, a road structure regarding the adjacent lane, and a regulation speed on a road of the adjacent lane.

5. The other-vehicle action prediction method according to claim 1, further comprising calculating the recognition possibility by use of a maximum recognition range which is a maximum range enabling the other vehicle to recognize the traffic regulation and a partial recognition range which is a range enabling the other vehicle to recognize the traffic regulation depending on a height of the other vehicle and a traveling condition of the other vehicle.

6. The other-vehicle action prediction method according to claim 5, further comprising calculating the recognition possibility which is higher in a case in which a road structure enabling the other vehicle to recognize the traffic regulation or a mark indicating the traffic regulation is included in both the maximum recognition range and the partial recognition range than in a case in which the road structure or the mark is not included in either the maximum recognition range or the partial recognition range.

7. The other-vehicle action prediction method according to claim 5, further comprising calculating the recognition possibility which is higher in a case in which either a road structure enabling the other vehicle to recognize the traffic regulation or a mark indicating the traffic regulation is entirely included in the maximum recognition range or the partial recognition range than in a case either the road structure or the mark is partly included in the maximum recognition range or the partial recognition range.

8. The other-vehicle action prediction method according to claim 5, further comprising calculating the recognition possibility which is higher as a distance from the other vehicle to a road structure enabling the other vehicle to recognize the traffic regulation or a mark indicating the traffic regulation is shorter.

9. The other-vehicle action prediction method according to claim 5, further comprising calculating the recognition possibility using, as the maximum recognition range or the partial recognition range, a host-vehicle recognition range enabling the host vehicle to recognize the traffic regulation.

10. The other-vehicle action prediction method according to claim 5, further comprising calculating the recognition possibility in accordance with a road structure enabling recognition of the traffic regulation or a mark indicating the traffic regulation actually detected by the host vehicle.

11. The other-vehicle action prediction method according to claim 1, further comprising acquiring the actual traveling state when detecting a change in the actual traveling state.

12. The other-vehicle action prediction method according to claim 11, further comprising detecting the change in the actual traveling state when actual traveling states at two different times have a difference of a first reference value or greater, or when amounts of change in actual traveling states per unit time at two different times have a difference of a second reference value or greater.

13. The other-vehicle action prediction method according to claim 11, further comprising acquiring the actual traveling state after being changed,
wherein the actual traveling state after being changed is represented by one of or a combination of two or more of values indicating a position, an attitude, a velocity, acceleration, and a traveling track of the other vehicle.

14. The other-vehicle action prediction method according to claim 11, further comprising acquiring change information as the actual traveling state which is information indicating a change in the traveling state,
wherein the change information is represented either by one of or a combination of two or more of values indicating a position, an attitude, a velocity, acceleration, and a traveling track of the other vehicle, or one of or a combination of two or more of states of the other vehicle regarding a direction of the other vehicle with respect to the adjacent lane or the own lane, a position of the other vehicle in the adjacent lane in a vehicle width direction, a velocity of the other vehicle, acceleration of the other vehicle, and deceleration of the other vehicle.

15. The other-vehicle action prediction method according to claim 1, further comprising:
comparing the predicted traveling state with the actual traveling state to calculate an amount of deviation of the actual traveling state with respect to the predicted traveling state;
predicting that the other vehicle makes the lane change when the recognition possibility is greater than a predetermined first threshold and the amount of deviation is greater than a predetermined second threshold; and
predicting that the other vehicle makes the lane change when the amount of deviation is greater than a predetermined third threshold greater than the predetermined second threshold.

16. The other-vehicle action prediction method according to claim 15, further comprising:
comparing the predicted traveling state with the actual traveling state to calculate a lane change probability indicating a probability that the other vehicle makes the lane change; and
calculating the lane change probability which is higher as the amount of deviation is greater.

17. The other-vehicle action prediction method according to claim 1, further comprising:
comparing the predicted traveling state with the actual traveling state to calculate discrepancy of the actual traveling state with respect to the predicted traveling state;
predicting that the other vehicle makes the lane change when the recognition possibility is greater than a predetermined fourth threshold and the discrepancy is greater than a predetermined fifth threshold; and
predicting that the other vehicle makes the lane change when the discrepancy is greater than a predetermined sixth threshold greater than the predetermined fifth threshold.

18. The other-vehicle action prediction method according to claim 17, further comprising:
comparing the predicted traveling state with the actual traveling state to calculate a lane change probability indicating a probability that the other vehicle makes the lane change; and calculating the lane change probability which is higher as the discrepancy is greater.

19. The other-vehicle action prediction method according to claim 1, further comprising:
   comparing the predicted traveling state with the actual traveling state to calculate a lane change probability indicating a probability that the other vehicle makes the lane change; and
   predicting that the other vehicle makes the lane change when the lane change probability is greater than a predetermined seventh threshold.

20. The other-vehicle action prediction method according to claim 19, further comprising:
   comparing the predicted traveling action with the actual traveling action; and
   calculating the lane change probability in accordance with the comparison result and the recognition possibility.

21. The other-vehicle action prediction method according to claim 19, further comprising calculating the lane change probability which is higher in an order of a signboard, a filter traffic light, a road-surface sign, and a road structure each being a mark indicating the traffic regulation.

22. The other-vehicle action prediction method according to claim 19, further comprising:
   acquiring an actual traveling state of a third vehicle traveling in the adjacent lane excluding the other vehicle; and
   comparing the actual traveling state of the third vehicle with the actual traveling state of the other vehicle to calculate the lane change probability.

23. The other-vehicle action prediction method according to claim 19, further comprising determining the lane change probability by use of a plurality of different reference values so as to control a vehicle distance between the host vehicle and the other vehicle or a velocity of the host vehicle in a multi-step manner.

24. An other-vehicle action prediction device comprising a control unit for predicting that another vehicle traveling in an adjacent lane adjacent to an own lane in which a host vehicle is traveling makes a lane change from the adjacent lane to the own lane in front of the host vehicle in accordance with a behavior of the other vehicle, the control unit being configured to:
   acquire an actual traveling state of the other vehicle;
   acquire traffic regulation information as information on a traffic regulation regarding the adjacent lane ahead of the other vehicle;
   predict a predicted traveling state which is a traveling state of the other vehicle when traveling according to the traffic regulation;
   calculate a recognition possibility indicating a possibility that the other vehicle recognizes the traffic regulation by use of a recognition range which is a range enabling the other vehicle to recognize the traffic regulation;
   compare the predicted traveling state with the actual traveling state;
   predict that the other vehicle makes the lane change in accordance with a comparison result and the recognition possibility;
   generate a route of the host vehicle based on predicting that the other vehicle makes the lane change; and
   autonomously control the host vehicle to travel the generated route.

* * * * *